US012266316B2

(12) United States Patent
Kim et al.

(10) Patent No.: US 12,266,316 B2
(45) Date of Patent: Apr. 1, 2025

(54) DATA DRIVING CIRCUIT AND DISPLAY DEVICE INCLUDING THE SAME

(71) Applicant: LG DISPLAY CO., LTD., Seoul (KR)

(72) Inventors: Kyu Jin Kim, Paju-si (KR); Bo Yun Jung, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 117 days.

(21) Appl. No.: 17/990,185

(22) Filed: Nov. 18, 2022

(65) Prior Publication Data

US 2023/0178033 A1 Jun. 8, 2023

(30) Foreign Application Priority Data

Dec. 2, 2021 (KR) ........................ 10-2021-0170548

(51) Int. Cl.
*G09G 5/10* (2006.01)
*G09G 3/3291* (2016.01)

(52) U.S. Cl.
CPC ..... *G09G 3/3291* (2013.01); *G09G 2310/027* (2013.01); *G09G 2320/0276* (2013.01); *G09G 2330/021* (2013.01)

(58) Field of Classification Search
CPC .. G09G 3/20; G09G 3/30; G09G 3/32; G09G 3/34; G09G 3/36; G09G 3/3258; G09G 3/3225; G09G 3/3291; G09G 3/3266; G09G 3/3275; G09G 2320/0276; G09G 2330/021; G09G 5/00; G09G 5/06; G09G 5/10; H04N 1/64; H04N 5/66; H04N 9/67; H04N 9/73; H04N 9/77; H04N 19/85; H04N 19/98;
(Continued)

(56) References Cited

U.S. PATENT DOCUMENTS 7,006,065 B1 2/2006 Sugawara et al.
2004/0075674 A1* 4/2004 Bu ....................... G09G 3/3696 345/690
(Continued)

FOREIGN PATENT DOCUMENTS

KR 10-2001-0051546 A 6/2001
KR 10-2017-0014578 A 2/2017
(Continued)

OTHER PUBLICATIONS

Office Action dated Dec. 26, 2024 issued in corresponding Korean Patent Application No. 10-2021-0170548.

*Primary Examiner* — Chanh D Nguyen
*Assistant Examiner* — Nguyen H Truong
(74) *Attorney, Agent, or Firm* — Morgan, Lewis & Bockius LLP

(57) ABSTRACT

The present disclosure relates to a data driving circuit and a display device including the same, and the data driving circuit includes a plurality of data input terminals to which pixel data of an input image is input, and a plurality of voltage input terminals to which gamma tab voltages for each color having different voltage levels, and common gamma tab voltages having different voltage levels are each input. When the input image includes pixel data having different grayscale values for each color, a data voltage of a corresponding color is changed when any one of the gamma tab voltages for each color is changed, and data voltages of all colors are changed when any one of the common gamma tab voltages is changed.

15 Claims, 12 Drawing Sheets

(58) Field of Classification Search
CPC ........ H04N 23/83; H04N 23/85; H10K 50/18; H10K 59/32; H10K 59/35; H10K 71/16; H10K 71/60; H01L 31/06; G02F 1/1335; G06K 9/00
See application file for complete search history.

(56) References Cited

U.S. PATENT DOCUMENTS

| | | | | |
|---|---|---|---|---|
| 2006/0071894 | A1 | 4/2006 | Sugawara et al. | |
| 2009/0167650 | A1* | 7/2009 | Seo | G09G 3/3275 345/80 |
| 2014/0320552 | A1* | 10/2014 | Seo | G09G 3/20 345/690 |
| 2016/0322001 | A1* | 11/2016 | Do | G09G 3/3291 |
| 2018/0018938 | A1 | 1/2018 | Lee et al. | |
| 2021/0090524 | A1* | 3/2021 | In | G09G 3/2003 |
| 2021/0366343 | A1 | 11/2021 | Oh et al. | |
| 2022/0392418 | A1* | 12/2022 | Tomizawa | G09G 3/3426 |

FOREIGN PATENT DOCUMENTS

| | | | |
|---|---|---|---|
| KR | 10-2018-0009153 | A | 1/2018 |
| KR | 10-2021-0144402 | A | 11/2021 |

* cited by examiner

DATA DRIVING CIRCUIT AND DISPLAY DEVICE INCLUDING THE SAME

CROSS-REFERENCE TO RELATED APPLICATION

This application claims priority to and the benefit of Korean Patent Application No. 10-2021-0170548, filed on Dec. 2, 2021, the disclosure of which is incorporated herein by reference in its entirety.

BACKGROUND

1. Technical Field

The present disclosure relates to a data driving circuit configured to generate a data voltage as an independent gamma voltage separated for each color in a low grayscale and generate a data voltage as a common gamma voltage in a middle grayscale and a high grayscale, and a display device using the same.

2. Discussion of the Related Art

Electroluminescent display devices are roughly classified into inorganic light emitting display devices and organic light emitting display devices depending on the material of the emission layer. The organic light emitting display device of an active matrix type includes an organic light emitting diode (hereinafter, referred to as "OLED") that emits light by itself, and has an advantage in that the response speed is fast and the luminous efficiency, luminance, and viewing angle are large. In the organic light emitting display device, the OLED is formed in each pixel. The organic light emitting display device not only has a fast response speed, excellent luminous efficiency, luminance, and viewing angle, but also has excellent contrast ratio and color reproducibility since it can express black gray scales in complete black.

Pixels of the organic light emitting display device have different efficiency of the light emitting element for each color. Accordingly, a data voltage may be set differently for each color of sub-pixels. In order to generate an independent gamma voltage for each color, a routing area of lines connected to a gamma voltage generating circuit generating gamma tab voltages must be increased, but the area is limited. In the related art, even when data voltage ranges of red, green, and blue are different from each other, a data voltage having no distinction for each color or a similar bit resolution may be output.

SUMMARY

Accordingly, embodiments of the present disclosure are directed to a data driving circuit and a display device including the same that substantially obviate one or more of the problems due to limitations and disadvantages of the related art.

An aspect of the present disclosure is to provide a data voltage generating circuit capable of outputting a data voltage having a different data voltage range for each color and realizing a high bit resolution in a high grayscale, and a display device including the same.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts, as embodied and broadly described herein, a data driving circuit comprises: a plurality of data input terminals to which pixel data of an input image is input; and a plurality of voltage input terminals to which gamma tab voltages for each color having different voltage levels and common gamma tab voltages having different voltage levels are each input. When the input image includes pixel data having different grayscale values for each color, a data voltage of a corresponding color may be changed when any one of the gamma tab voltages for each color is changed, and data voltages of all colors may be changed when any one of the common gamma tab voltages is changed.

In another aspect, a display device comprises: a display panel connected to a plurality of data lines and a plurality of gate lines, and in which an input image is displayed; and a drive IC configured to convert pixel data of the input image into a data voltage and supply the data voltage to the data lines.

The drive IC may include: a plurality of data input terminals to which the pixel data of the input image is input; and voltage input terminals to which gamma tab voltages for each color having different voltage levels and common gamma tab voltages having different voltage levels are each input.

When the input image includes pixel data having different grayscale values for each color, distortion may occur in a corresponding color of an image displayed on the display panel when any one of the gamma tab voltages for each color is changed, and distortion may occur in all colors of an image displayed on the display panel when any one of the common gamma tab voltages is changed.

It is to be understood that both the foregoing general description and the following detailed description are exemplary and explanatory and are intended to provide further explanation of the inventive concepts as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain various principles. In the drawings.

DETAILED DESCRIPTION

Figure 1:
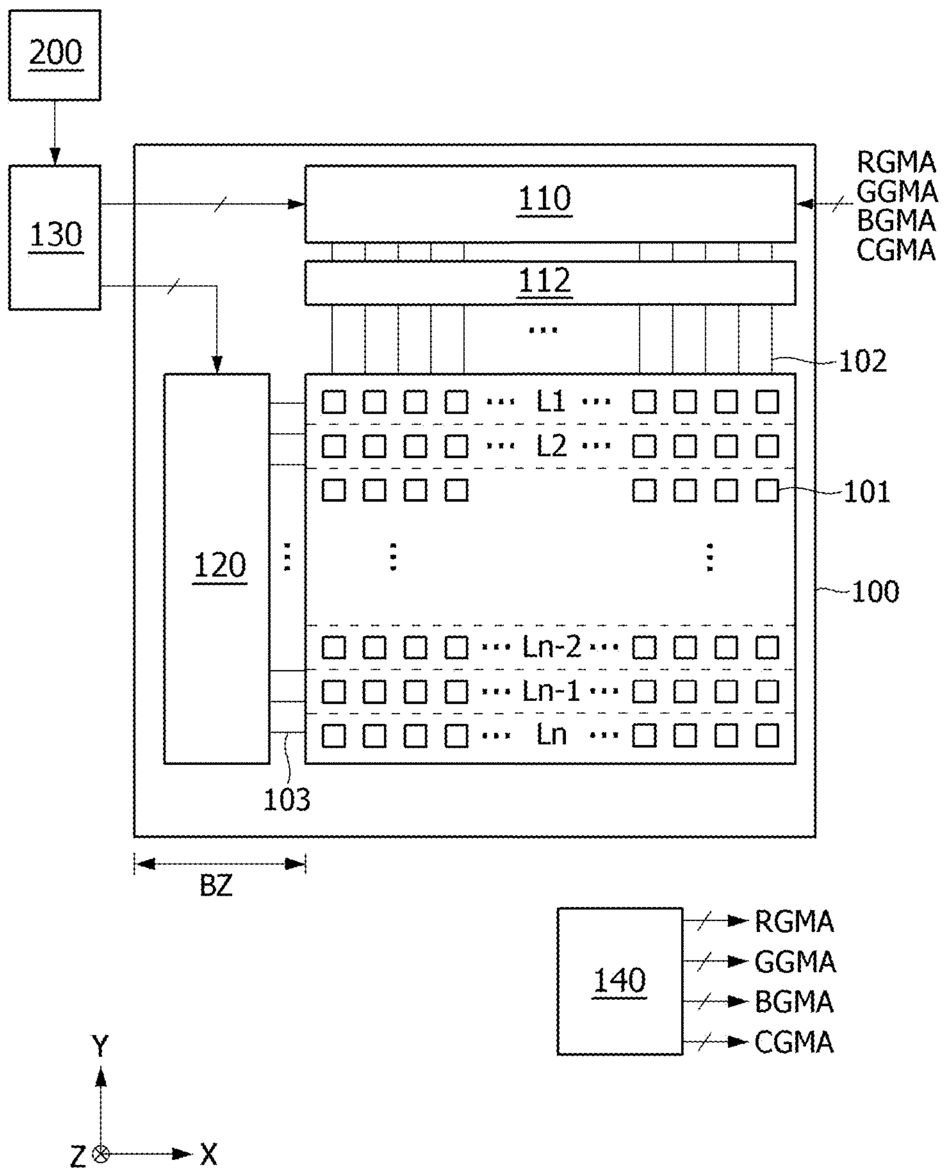
FIG. 1 is a block diagram schematically illustrating a display panel according to an exemplary embodiment of the present disclosure.

The advantages and features of the present disclosure and methods for accomplishing the same will be more clearly understood from embodiments described below with reference to the accompanying drawings. However, the present disclosure is not limited to the following embodiments but may be implemented in various different forms. Rather, the present embodiments will make the disclosure of the present disclosure complete and allow those skilled in the art to completely comprehend the scope of the present disclosure. The present disclosure is only defined within the scope of the accompanying claims.

The shapes, sizes, ratios, angles, numbers, and the like illustrated in the accompanying drawings for describing the embodiments of the present disclosure are merely examples, and the present disclosure is not limited thereto. Like reference numerals generally denote like elements throughout the present specification. Further, in describing the present disclosure, detailed descriptions of known related technologies may be omitted to avoid unnecessarily obscuring the subject matter of the present disclosure.

The terms such as "comprising," "including," "having," and "consist of" used herein are generally intended to allow other components to be added unless the terms are used with the term "only." Any references to singular may include plural unless expressly stated otherwise.

Components are interpreted to include an ordinary error range even if not expressly stated.

When the position relation between two components is described using the terms such as "on," "above," "below," and "next," one or more components may be positioned between the two components unless the terms are used with the term "immediately" or "directly."

The terms "first," "second," and the like may be used to distinguish components from each other, but the functions or structures of the components are not limited by ordinal numbers or component names in front of the components.

The following embodiments can be partially or entirely bonded to or combined with each other and can be linked and operated in technically various ways. The embodiments can be carried out independently of or in association with each other.

Each of the pixels may include a plurality of sub-pixels having different colors to in order to reproduce the color of the image on a screen of the display panel. Each of the sub-pixels includes a transistor used as a switch element or a driving element. Such a transistor may be implemented as a TFT (Thin Film Transistor).

A driving circuit of the display device writes a pixel data of an input image to pixels on the display panel. To this end, the driving circuit of the display device may include a data driving circuit configured to supply data signal to the data lines, a gate driving circuit configured to supply a gate signal to the gate lines, and the like.

In a display device of the present disclosure, the pixel circuit and the gate driving circuit may include a plurality of transistors. Transistors may be implemented as oxide thin film transistors (oxide TFTs) including an oxide semiconductor, low temperature polysilicon (LTPS) TFTs including low temperature polysilicon, or the like. In embodiments, descriptions will be given based on an example in which the transistors of the pixel circuit and the gate driving circuit are implemented as the n-channel oxide TFTs, but the present disclosure is not limited thereto.

Generally, a transistor is a three-electrode element including a gate, a source, and a drain. The source is an electrode that supplies carriers to the transistor. In the transistor, carriers start to flow from the source. The drain is an electrode through which carriers exit from the transistor. In a transistor, carriers flow from a source to a drain. In the case of an n-channel transistor, since carriers are electrons, a source voltage is a voltage lower than a drain voltage such that electrons may flow from a source to a drain. The n-channel transistor has a direction of a current flowing from the drain to the source. In the case of a p-channel transistor (p-channel metal-oxide semiconductor (PMOS)), since carriers are holes, a source voltage is higher than a drain voltage such that holes may flow from a source to a drain. In the p-channel transistor, since holes flow from the source to the drain, a current flows from the source to the drain. It should be noted that a source and a drain of a transistor are not fixed. For example, a source and a drain may be changed according to an applied voltage. Therefore, the disclosure is not limited due to a source and a drain of a transistor. In the following description, a source and a drain of a transistor will be referred to as a first electrode and a second electrode.

A gate signal swings between a gate-on voltage and a gate-off voltage. The transistor is turned on in response to the gate-on voltage and is turned off in response to the gate-off voltage. In the case of an n-channel transistor, a gate-on voltage may be a gate high voltage, and a gate-off voltage may be a gate low voltage. In the case of an p-channel transistor, a gate-on voltage may be the gate low voltage, and a gate-off voltage may be the gate high voltage.

Hereinafter, various embodiments of the present disclosure will be described in detail with reference to the accompanying drawings.

Figure 2:
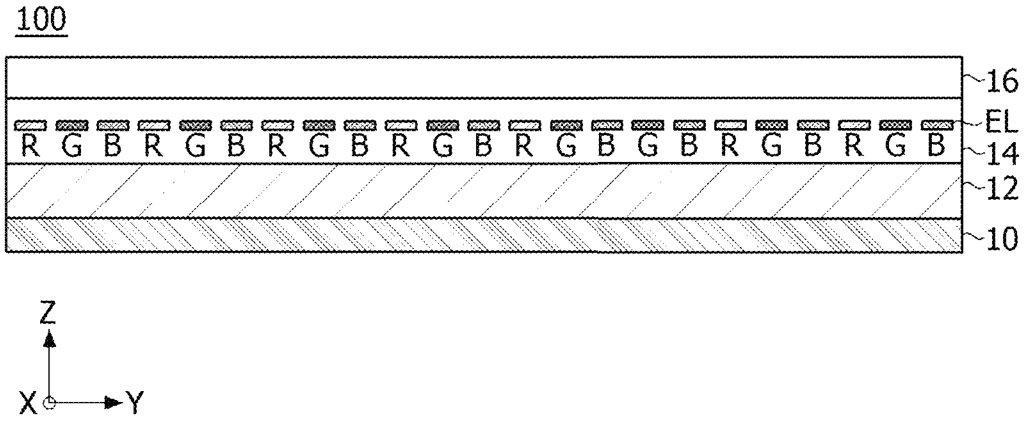
FIG. 2 is a cross-sectional view illustrating a cross-sectional structure of the display panel shown in FIG. 1.

Referring to FIGS. 1 and 2, a display device according to an exemplary embodiment of the present disclosure includes the display panel 100, a display panel driver configured to write pixel data to pixels 101 of the display panel 100, and a power supply unit 140 configured to generate power required to drive the pixels 101 and the display panel driver.

The display panel 100 may be a display panel having a rectangular structure having a length in an X-axis direction, a width in a Y-axis direction, and a thickness in a Z-axis direction. The display panel 100 includes a pixel array that displays an input image on a screen. The pixel array includes a plurality of data lines 102, a plurality of gate lines 103 crossing the data lines 102, and pixels disposed in a matrix form. The display panel 100 may further include power lines commonly connected to the pixels. The power lines may include a power line to which a pixel driving voltage ELVDD is applied, a power line to which an initialization voltage Vini is applied, a power line to which a reference voltage Vref is applied, a power line to which a low-potential power voltage ELVSS is applied, and the like. These power lines are commonly connected to the pixels.

The pixel array includes a plurality of pixel lines L1 to Ln. Each of the pixel lines L1 to Ln includes one line of pixels disposed along a line direction X in the pixel array of the display panel 100. The pixels disposed in the one pixel line share the gate lines 103. Sub-pixels disposed in a column direction Y along a data line direction share the same data line 102. One horizontal period 1H is a time obtained by dividing one frame period by the total number of the pixel lines L1 to Ln.

The display panel 100 may be implemented as a non-transmissive display panel or a transmissive display panel. The transmissive display panel may be applied to a transparent display device in which an image is displayed on a screen and an actual object of a background is visible.

The display panel may be manufactured as a flexible display panel. The flexible display panel may be implemented as an organic light-emitting-diode (OLED) panel using a plastic substrate. The pixel array and a light emitting element of the plastic OLED panel may be disposed on an organic thin film adhered to a back plate.

Each of the pixels 101 may be divided into a red sub-pixel, a green sub-pixel, and a blue sub-pixel to implement a color. Each of the pixels may further include a white sub-pixel. Each of the sub-pixels includes a pixel circuit. Hereinafter, a pixel may be interpreted as the same meaning as a sub-pixel. Each of the pixel circuits is connected to the data lines, the gate lines, and the power lines. Hereinafter, a first color may be interpreted as red, a second color may be interpreted as green, and a third color may be interpreted as blue, but the present disclosure is not limited thereto.

Figure 3:
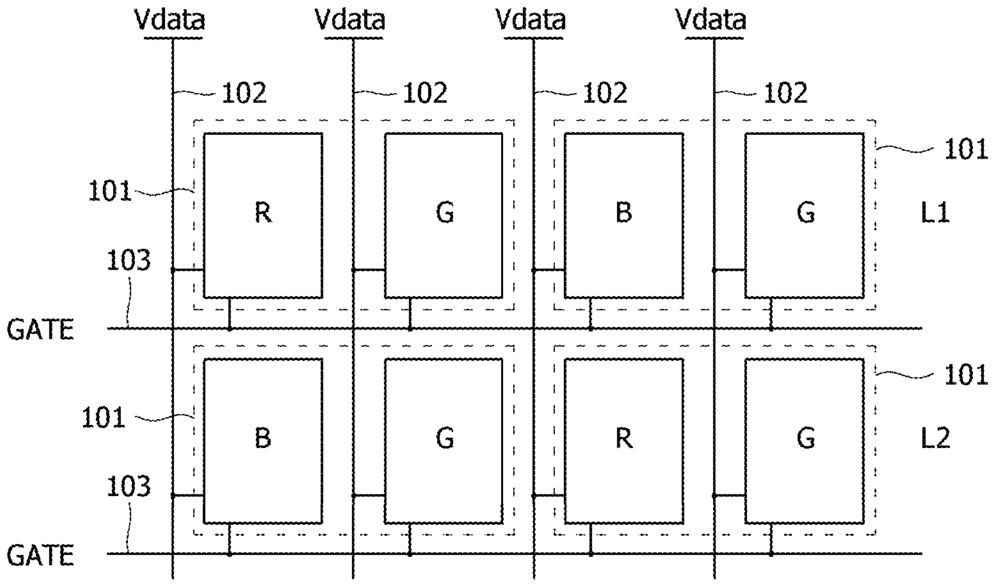
FIGS. 3 and 4 are views illustrating color arrangement of sub-pixels applicable to a display device of the present disclosure.

The pixels may be disposed as real color pixels and pentile pixels. As shown in FIG. 3, the pentile pixels may implement a higher resolution than the real color pixels by driving two sub-pixels having different colors as one pixel 101 using a preset pixel rendering algorithm. The pixel rendering algorithm may compensate for insufficient color expression in each pixel with a color of light emitted from an adjacent pixel.

Touch sensors may be disposed on the screen of the display panel 100. The touch sensors may be disposed on the screen of the display panel as on-cell type or add-on type touch sensors, or implemented as in-cell type touch sensors embedded in a pixel array AA.

The cross-sectional structure of the display panel 100 may include a circuit layer 12, a light emitting element layer 14, and an encapsulation layer 16 stacked on a substrate 10 as shown in FIG. 2.

The circuit layer 12 may include a TFT array including a pixel circuit connected to wirings such as a data line, a gate line, and a power line, a de-multiplexer array 112, a gate driver 120, and the like. The wirings and circuit elements of the circuit layer 12 may include a plurality of insulating layers, two or more metal layers separated with the insulating layer therebetween, and an active layer having a semiconductor material.

The light emitting element layer 14 may include a light emitting element EL driven by a pixel circuit. The light emitting element EL may include a red (R) light emitting element, a green (G) light emitting element, and a blue (B) light emitting element. In another embodiment, the light emitting element layer 14 may include a white light emitting element and a color filter. The light emitting elements EL of the light emitting element layer 14 may be covered by a multi-passivation layer including an organic film and an inorganic film.

The encapsulation layer 16 covers the light emitting element layer 14 to seal the circuit layer 12 and the light emitting element layer 14. The encapsulation layer 16 may have a multilayered insulating structure in which an organic film and an inorganic film are alternately stacked. The inorganic film blocks the penetration of moisture and oxygen. The organic film planarizes the surface of the inorganic film. When the organic film and the inorganic film are stacked in multiple layers, a penetration path of moisture or oxygen becomes longer compared to a single layer, so that penetration of moisture and oxygen affecting the light emitting element layer 14 can be effectively blocked.

A touch sensor layer omitted from the drawings may be disposed on an encapsulation layer 16. The touch sensor layer may include capacitive touch sensors that sense a touch input based on a change in capacitance before and after the touch input. The touch sensor layer may include metal line patterns and insulating films forming the capacitance of the touch sensors. The capacitance of the touch sensor may be formed between the metal line patterns. A polarizing plate may be disposed on the touch sensor layer. The polarizing plate may improve visibility and contrast ratio by converting polarized light of external light reflected by metal of the touch sensor layer and the circuit layer 12. The polarizing plate may be implemented as a polarizing plate in which a linear polarizing plate and a phase retardation film are bonded or a circular polarizing plate. A cover glass may be adhered on the polarizing plate.

The display panel 100 may further include a touch sensor layer stacked on the encapsulation layer 16 and a color filter layer. The color filter layer may include red, green, and blue color filters and a black matrix pattern. The color filter layer may serve as a polarizing plate and increase color purity by absorbing a portion of a wavelength of light reflected from the circuit layer and the touch sensor layer. In this exemplary embodiment, a light transmittance of the display panel PNL can be improved and the thickness and flexibility of the display panel PNL can also be improved by applying the color filter layer having a higher light transmittance than the polarizing plate to the display panel. A cover glass may be adhered on the color filter layer.

The power supply unit 140 generates direct current (DC) power (or a constant voltage) required for driving the pixel array of the display panel 100 and the display panel driver using a DC-DC converter. The DC-DC converter may include a charge pump, a regulator, a buck converter, a boost converter, and the like. The power supply unit 140 may generate constant voltages (or direct current voltages) such as a gate-on voltage, a gate-off voltage, the pixel driving voltage ELVDD, the low-potential power voltage ELVSS, the reference voltage Vref, and the initialization voltage Vini, a voltage applied to a gate driver 120, and the like by adjusting a DC input voltage applied from a host system 200. The gate-on voltage and the gate-off voltage are supplied to the gate driver 120. The constant voltages such as the pixel driving voltage ELVDD, the low-potential power supply voltage ELVSS, the reference voltage Vref, and the initialization voltage Vini are commonly supplied to the pixels. The power supply unit 140 may change a voltage level of an output voltage under the control of a timing controller (T-con) 130.

The power supply unit 140 further includes a gamma voltage generating circuit. The gamma voltage generating circuit generates gamma tab voltages for each color RGMA, GGMA, and BGMA separated by color of the sub-pixels and a common gamma tab voltage CGMA not separated by color. The gamma voltage generating circuit may be implemented as a programmable gamma integrated circuit (IC) (P-GMA IC).

The gamma tab voltages for each color RGMA, GGMA, and BGMA determine a voltage for each grayscale in a data voltage range different for each color in a low grayscale less than or equal to a reference grayscale. Each of the gamma tab voltages for each color RGMA, GGMA, and BGMA includes inflection point voltages of a non-linear gamma curve. The common gamma tab voltage CGMA determines a data voltage having no distinction for each color in a middle and high grayscale higher than the reference grayscale. The common gamma tab voltage CGMA includes a minimum voltage and a maximum voltage of a linear gamma curve. The reference grayscale may be determined based on an image quality evaluation experiment of the display panel. For example, the reference grayscale may be determined between a grayscale 31 and a grayscale 64.

The display panel driver writes pixel data of an input image to the pixels 101. The display panel driver includes a data driver 110 and the gate driver 120. The display panel driver may further include a de-multiplexer array 112 disposed between the data driver 110 and the data lines 102.

The de-multiplexer array 112 sequentially supplies the data voltage output from each of the data output channels of the data driver 110 to the data lines 102 using a plurality of de-multiplexers DEMUX. The de-multiplexer may include a plurality of switch elements disposed on the display panel 100. When the de-multiplexer is disposed between the output terminals of the data driver 110 and the data lines 102, the number of data output channels of the data driver 110 may be reduced. The de-multiplexer array 112 may be omitted. In this case, the output terminals of the data driver 110 are directly connected to the data lines 102.

The display panel driver may further include a touch sensor driver configured to drive the touch sensors. The touch sensor driver is omitted from FIG. 1. The data driver and the touch sensor driver may be integrated into one drive IC. In a mobile device or a wearable device, the timing controller 130, the power supply unit 140, the data driver 110, the touch sensor driver, and the like, may be integrated into one drive IC.

The display panel driver may operate in a low-speed driving mode under the control of the timing controller 130. The low-speed driving mode may be set to reduce power consumption of the display device when it is found by analyzing the input image that an input image does not change for a preset time. In the low-speed driving mode, power consumption of the display panel driver and the display panel 100 may be reduced by lowering a refresh rate of pixels when a still image is input for a predetermined time or longer. The low-speed driving mode is not limited to when a still image is input. For example, the display panel driving circuit may operate in the low-speed driving mode when the display device operates in a standby mode or when a user command or an input image is not input to the display panel driving circuit for a predetermined time or longer.

The data driver 110 outputs a data voltage by converting pixel data of an input image received as a digital signal from the timing controller 130 into a gamma compensation voltage in every frame period using a digital-to-analog converter (hereinafter, referred to as a "DAC"). The data driver 110 includes a voltage dividing circuit configured to output a gamma compensation voltage for each grayscale separated for each color by dividing the gamma tab voltages for each color RGMA, GGMA, and BGMA, and the common gamma tab voltage CGMA input from the gamma voltage generating circuit of the power supply unit 140. The voltage dividing circuit consists of series-connected resistors and outputs the gamma compensation voltage through dividing nodes among the resistors. The gamma compensation voltage for each grayscale divided by the voltage dividing circuit is provided to the DAC of the data driver 110. The data voltage is output through an output buffer in each of the data output channels of the data driver 110.

The DAC of the data driver 110 receives a gamma reference voltage divided through the voltage dividing circuit. The DAC outputs a data voltage for each color by converting the pixel data into the gamma compensation voltage of a corresponding color supplied through the voltage dividing circuit.

The gate driver 120 may be implemented as a gate in panel (GIP) circuit directly formed on the circuit layer 12 of the display panel 100 together with the pixel circuit and lines connected to the pixel array. The GIP circuit may be disposed on a bezel area BZ, which is a non-display area of the display panel 100, or may be distributed and disposed in a pixel array in which an input image is reproduced. The gate driver 120 sequentially outputs the gate signal to the gate lines 103 under the control of the timing controller 130. The gate driver 120 may sequentially supply the gate signals to the gate lines 103 by shifting the gate signals using a shift register. The gate signal may include a scan pulse and an emission control pulse (hereinafter, referred to as an "EM pulse"). Each of the scan pulse and the EM pulse swings between the gate-on voltage and the gate-off voltage.

The shift register of the gate driver 120 outputs a pulse of the gate signal in response to a start pulse and a shift clock, and shifts the pulse according to a shift clock timing.

The timing controller 130 receives digital video data DATA of an input image and a timing signal synchronized with the digital video data DATA from the host system 200. The input image includes at least pixel data of a first color, pixel data of a second color, and pixel data of a third color. The timing signal may include a vertical synchronization signal Vsync, a horizontal synchronization signal Hsync, a clock CLK, a data enable signal DE, and the like. Since a vertical period and a horizontal period may be known by counting the data enable signal DE, the vertical synchronization signal Vsync and the horizontal synchronization signal Hsync may be omitted. The data enable signal DE has a period of one horizontal period (1H).

The timing controller 130 may control an operation timing of the display panel driver at a frame frequency of the input frame frequency×i (i is a natural number) Hz by multiplying the input frame frequency by i times in a normal driving mode. The input frame frequency is 60 Hz in the National Television Standards Committee (NTSC) scheme and 50 Hz in the Phase-Alternating Line (PAL) scheme.

The timing controller 130 lowers a frame frequency at which pixel data is written to pixels in the low-speed driving mode compared to the normal driving mode. For example, the display panel driver may write pixel data to the pixels at a frame frequency of 60 Hz or higher, for example, any one of 60 Hz, 120 Hz, and 144 Hz, in the normal driving mode under the control of the timing controller 130, and may write pixel data to the pixels at a low frame frequency of about 1 Hz to 30 Hz in the low-speed driving mode.

The timing controller 130 generates a data timing control signal for controlling the operation timing of the data driver 110, a control signal for controlling the operation timing of the de-multiplexer array 112, and a gate timing control signal for controlling the operation timing of the gate driver 120 based on the timing signals Vsync, Hsync, and DE received from the host system 200. The timing controller 130 controls the operation timing of the display panel driver to synchronize the data driver 110, the de-multiplexer array 112, the touch sensor driver, and the gate driver 120.

The gate timing control signal output from the timing controller 130 may be supplied to a level shifter not shown in the drawings. The level shifter may receive a gate timing signal from the timing controller 130 to generate a start pulse and a shift clock. The start pulse and the shift clock swing between the gate-on voltage VGH and the gate-off voltage VGL. The start pulse and shift clock output from the level shifter are supplied to the gate driver 120.

The host system 200 may be any one of a television (TV) system, a tablet computer, a notebook computer, a navigation system, a personal computer (PC), a home theater system, a mobile device, a wearable device, and a vehicle system. The host system 200 may scale an image signal from a video source to fit the resolution of the display panel 100 and transmit the scaled signal to the timing controller 13 together with the timing signal. The host system 200 may include a main power supply generating the pixel driving voltage ELVDD and a DC input voltage supplied to the power supply unit 140.

Figure 4:
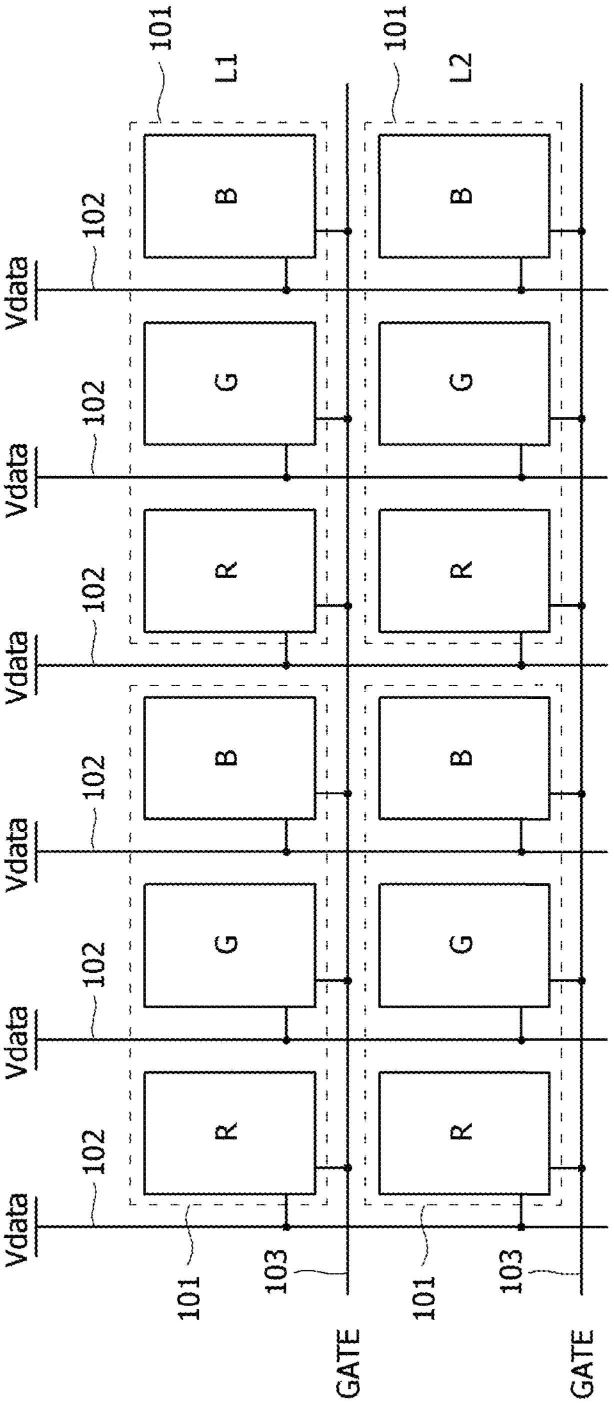

The pixels may have the color arrangement as shown in FIGS. 3 and 4. Each of the pixels 101 illustrated in FIG. 3 may include two sub-pixels having different colors. Each of the real color pixels 101 illustrated in FIG. 4 includes three primary color sub-pixels of red, green, and blue. In FIGS. 3 and 4, Vdata is a data voltage applied to the data lines 102, and GATE is a gate signal applied to the gate lines 103.

The pixel circuit includes a driving element configured to drive a light emitting element in each of the sub-pixels. Due to a process deviation caused by a manufacturing process of the display panel 100 and a device characteristic deviation, there may be a difference in electrical characteristics of the driving element among pixels, and the difference may increase as driving time of the pixels elapses. Internal compensation technology or external compensation technology may be applied to the display device to compensate for variations in the electrical characteristics of the driving element among pixels. The internal compensation technology compensates a gate-source voltage Vgs of the driving element by a threshold voltage by sampling the threshold voltage of the driving element for each sub-pixel using an internal compensation circuit implemented in each pixel circuit. The external compensation technology senses a current or voltage of the driving element that changes according to the electrical characteristics of the driving element in real time using an external compensation circuit. The external compensation technology compensates for deviation (or change) in the electrical characteristics of the driving element in each pixel in real time by modulating the pixel data (digital data) of the input image by the electric characteristic deviation (or change) of the driving element sensed for each pixel.

FIGS. 5 to 8 are views illustrating pixel circuits applicable to the display device of the present disclosure.

Figure 5:
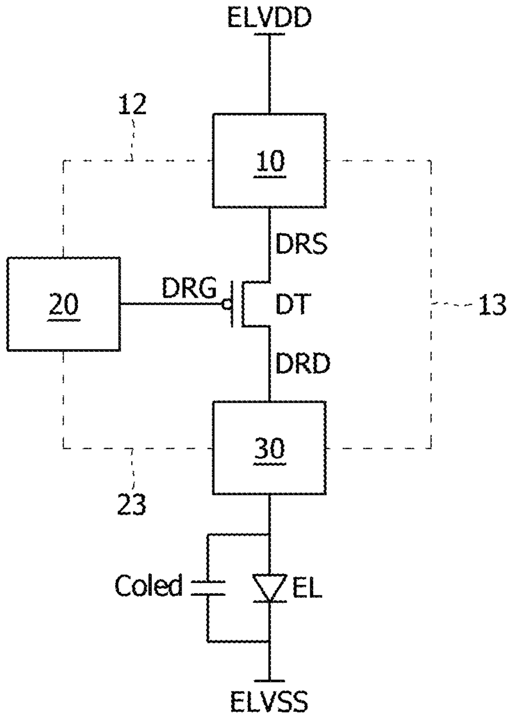
FIGS. 5 to 8 are views illustrating pixel circuits applicable to the display device of the present disclosure.

Referring to FIG. 5, the pixel circuit includes a light emitting element EL, a driving element DT, and circuit units 10, 20, and 30. Each of the driving element DT and switch elements of the circuit units 10, 20, and 30 may be implemented as transistors.

A first circuit unit 10 supplies the pixel driving voltage ELVDD to the driving element DT. The driving element DT includes a gate DRG, a source DRS, and a drain DRD. A second circuit unit 20 charges a capacitor connected to the gate DRG of the driving element DT and maintains a voltage of the capacitor for one frame period. A third circuit unit 30 provides a current supplied from the pixel driving voltage ELVDD to the light emitting element EL through the driving element DT. A first connection unit 12 connects the first circuit unit 10 and the second circuit unit 20. A second connection unit 23 connects the second circuit unit 20 and the third circuit unit 30. A third connection unit 13 connects the third circuit unit 30 and the first circuit unit 10.

The light emitting element EL may be implemented as an OLED. The OLED includes an organic compound layer formed between an anode electrode and a cathode electrode. The organic compound layer includes a hole injection layer HIL, a hole transport layer HTL, an emission layer EML, an electron transport layer ETL and an electron injection layer EIL, but is not limited thereto. When a voltage is applied to the anode and cathode electrodes of the OLED, and a current flows through the OLED, holes passing through the hole transport layer HTL and electrons passing through the electron transport layer ETL are moved to the light emitting layer EML to form excitons and the light emitting layer EML emits visible light. "Coled" is a capacitance of the light emitting element EL.

Figure 6:
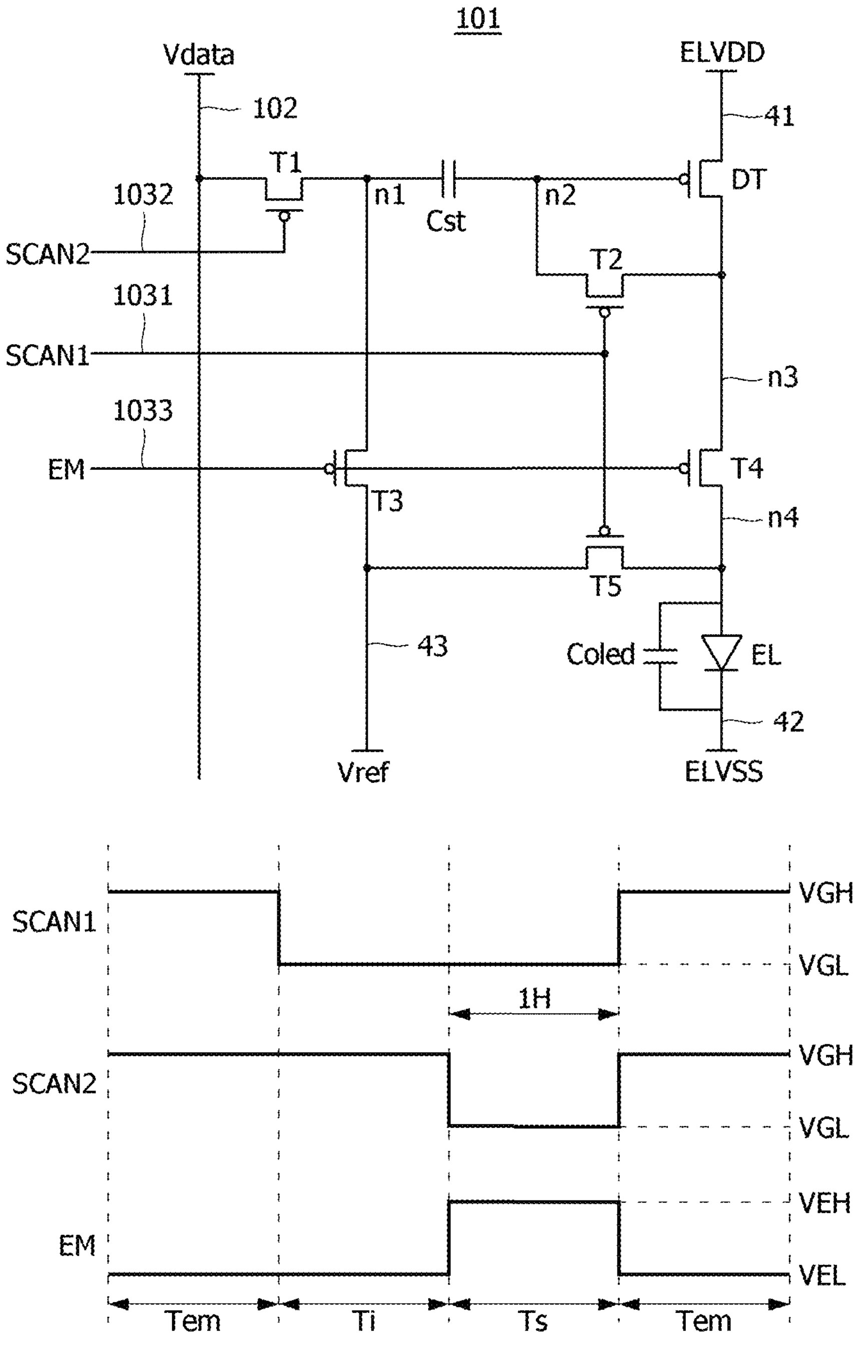
Figure 7:
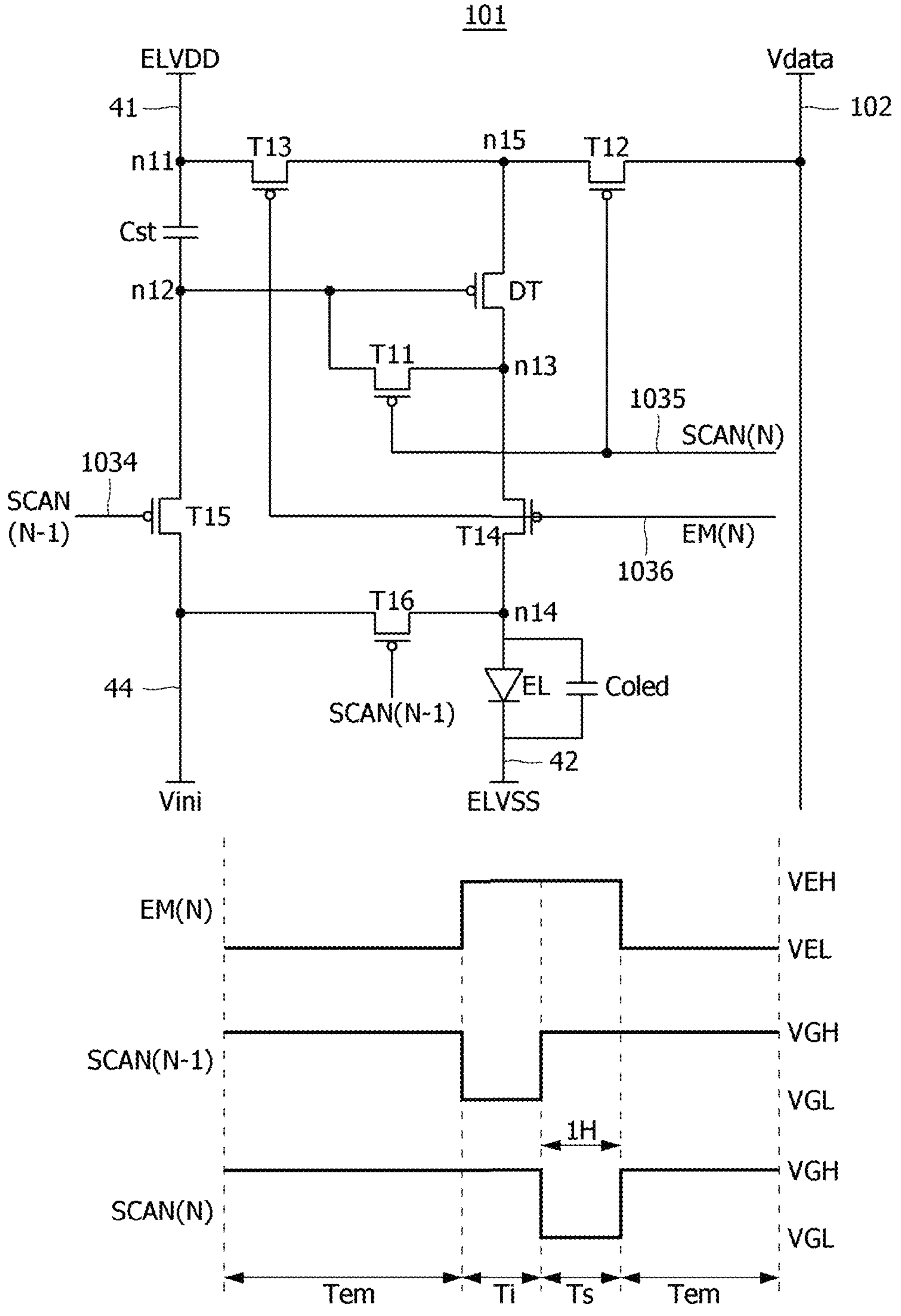
Figure 8:
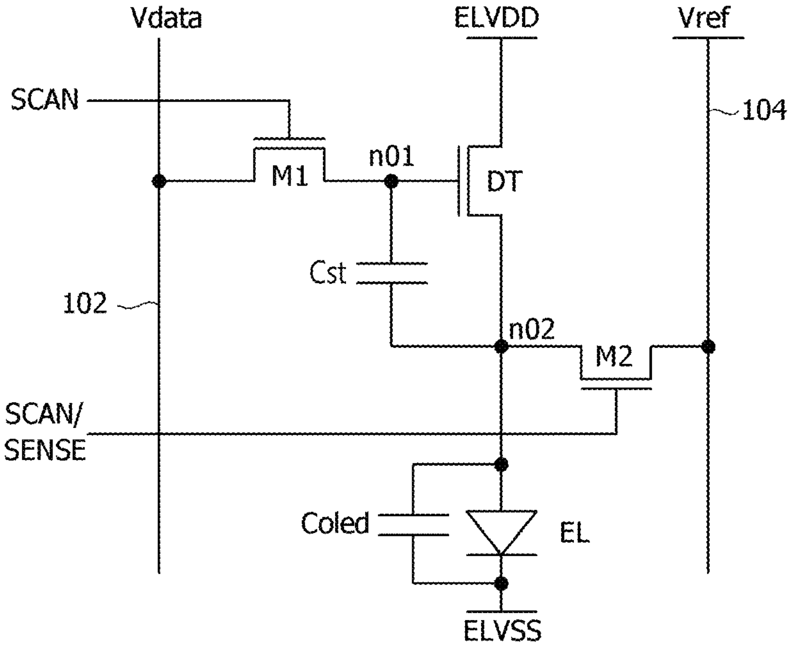

The circuit units 10, 20, and 30 may include an internal compensation circuit and/or an external compensation circuit. The circuits shown in FIGS. 6 and 7 are examples of pixel circuits to which the internal compensation circuit is applied. In FIGS. 6 and 7, the driving element DT and switch elements T1 to T16 may be implemented as p-channel transistors. The circuit shown in FIG. 8 is an example of a pixel circuit to which the external compensation circuit is applied. It should be noted that the pixel circuit of the present disclosure is not limited to FIGS. 6 to 8.

Referring to FIG. 6, the anode electrode of the light emitting element EL is connected to a fourth switch element T4 and a fifth switch element T5 through a fourth node n4. The cathode electrode of the light emitting element EL is connected to a second power line 42 to which the low-potential power voltage ELVSS is applied. The driving element DT drives the light emitting element EL by controlling an amount of current flowing through the light emitting element EL according to the gate-source voltage Vgs. The current flowing through the light emitting element EL may be switched by the fourth switch element T4. A capacitor Cst is connected between a first node n1 and a second node n2.

A first switch element T1 supplies a data voltage Vdata to the first node n1 in response to a second scan pulse SCAN2. The first switch element T1 includes a gate electrode connected to a second gate line 1032, a first electrode connected to the data line 102, and a second electrode connected to the first node n1.

The second scan pulse SCAN2 is supplied to the pixels 101 through the second gate line 1032. The second scan pulse SCAN2 is generated as a pulse of the gate-on voltage VGL. A pulse of the second scan pulse SCAN2 defines a sensing phase Ts. A pulse width of the second scan pulse SCAN2 may be set to approximately one horizontal period 1H. The second scan pulse SCAN2 changes to the gate-on voltage VGL later than a first scan pulse SCAN1 and changes to the gate-off voltage VGH at the same time as the first scan pulse SCAN1. The pulse width of the second scan pulse SCAN2 is set to be smaller than that of the first scan pulse SCAN1. During an initialization phase Ti and a light emission phase Tem, the voltage of the second scan pulse SCAN2 maintains the gate-off voltage VGH.

A second switch element T2 connects a gate of the driving element DT and a second electrode of the driving element DT in response to the first scan pulse SCAN1 to operate the driving element DT as a diode. The second switch element T2 includes a gate electrode connected to a first gate line 1031, a first electrode connected to the second node n2, and a second electrode connected to a third node n3.

The first scan pulse SCAN1 is supplied to the pixels 101 through the first gate line 1031. The first scan pulse SCAN1 may be generated as a pulse of the gate-on voltage VGL. A pulse of the first scan pulse SCAN1 defines the initialization phase Ti and the sensing phase Ts. During the light emission phase Tem, the voltage of the first scan pulse SCAN1 maintains the gate-off voltage VGH.

A third switch element T3 supplies a predetermined reference voltage Vref to the first node n1 in response to the gate-on voltage VEL of an EM pulse EM. The reference voltage Vref is supplied to the pixels 101 through a third power line 43. The third switch element T3 includes a gate electrode connected to a third gate line 1033, a first electrode connected to the first node n1, and a second electrode connected to the third power line 43. The EM pulse EM defines an on/off time of the light emitting element EL.

A pulse of the EM pulse EM may be generated as the gate-off voltage VGH to block a current path between the first node n1 and the third power line 43, and a current path of the light emitting element EL during the sensing phase Ts. The EM pulse EM may be inverted to the gate-off voltage VGH when the second scan pulse SCAN2 is inverted to the gate-on voltage VGL, and may be inverted to the gate-on voltage VGL after the first scan pulse SCAN1 and the second scan pulse SCAN2 are inverted to the gate-off voltages VGH. In order to accurately express a low gray-scale luminance, the EM pulse EM may swing between the gate-on voltage VEL and the gate-off voltage VEH at a predetermined duty ratio during the light emission phase Tem.

A fourth switch element T4 switches the current path of the light emitting element EL in response to the EM pulse EM. A gate electrode of the fourth switch element T4 is connected to the third gate line 1033. A first electrode of the fourth switch element T4 is connected to the third node n3, and a second electrode of the fourth switch element T4 is connected to the fourth node n4.

A fifth switch element T5 is turned on according to the gate-on voltage VGL of the first scan pulse SCAN1 to supply the reference voltage Vref to the fourth node n4 during the initialization phase Ti and the sensing phase Ts. During the initialization phase Ti and the sensing phase Ts, an anode voltage of the light emitting element EL is discharged to the reference voltage Vref. At this time, the light emitting element EL does not emit light because a voltage between the anode electrode and the cathode electrode is smaller than a threshold voltage of the light emitting element EL. The fifth switch element T5 includes a gate electrode connected to the first gate line 1031, a first electrode connected to the third power line 43, and a second electrode connected to the fourth node n4.

The driving element DT drives the light emitting element EL by controlling a current flowing through the light emitting element EL according to the gate-source voltage Vgs. The driving element DT includes a gate electrode connected to the second node n2, a first electrode connected to a first power line 41, and a second electrode connected to the third node n3. The pixel driving voltage ELVDD is supplied to the pixels 101 through the first power line 41.

As shown in FIG. 6, a driving period of the pixel circuit may be divided into the initialization phase Ti, the sensing phase Ts, and the light emission phase Tem.

In the initialization phase Ti, the voltages of the first scan pulse SCAN1 and the EM pulse EM are the gate-on voltage VGL. The second to fifth switch elements T2 to T5 are turned on in the initialization phase Ti and the voltages of the first node n1, the second node n2, and the fourth node n4 are discharged to the reference voltage Vref. As a result, in the initialization phase Ti, the capacitor Cst, the gate voltage of the driving element DT, and the anode voltage of the light emitting element EL are initialized to the reference voltage Vref.

In the sensing phase Ts, the first switch element T1, the second switch element T2, and the fifth switch element T5 are turned on according to the gate-on voltage VGL of the first scan pulse SCAN1 and the second scan pulse SCAN2. At this time, the data voltage Vdata is applied to the first node n1 and the voltage of the second node n2 is changed to ELVDD+Vth. As a result, the threshold voltage Vth of the driving element DT is sensed and charged in the second node n2 in the sensing phase Ts. During the sensing phase Ts, the capacitor Cst is charged with the data voltage Vdata compensated by the threshold voltage Vth of the driving element DT.

In the light emission phase Tem, the voltage of the EM pulse EM is inverted to the gate-on voltage VGL. The third switch element T3 and the fourth switch element T4 are turned on in the light emission phase Tem. At this time, the voltage of the first node n1 is changed to the reference voltage Vref, and the voltage of the second node n2 is changed to Vref−Vdata+ELVDD+Vth. In the light emission phase Tem, the light emitting element EL is driven by a current provided through the driving element DT to emit light. The current flowing through the light emitting element EL is adjusted according to the gate-source voltage Vgs of the driving element DT. The gate-source voltage Vgs of the driving element DT is Vgs=Vref−Vdata+Vth during the light emission phase Tem.

Referring to FIG. 7, the gate signal applied to the pixel circuit includes an (N−1)th scan pulse SCAN(N−1), an Nth scan pulse SCAN(N), and an EM pulse EM(N). The (N−1)th scan pulse SCAN(N−1) is synchronized with the data voltage Vdata of an (N−1)th pixel line. The Nth scan pulse SCAN(N) is synchronized with the data voltage Vdata of an Nth pixel line. A pulse of the Nth scan pulse SCAN(N) is generated with the same pulse width as the (N−1)th scan pulse SCAN(N−1), and is generated later than a pulse of the (N−1)th scan pulse SCAN(N−1).

A capacitor Cst is connected between a first node n11 and a second node n12. The pixel driving voltage ELVDD is supplied to a pixel circuit through a first power line 41. The first node n11 is connected to the first power line 41, a first electrode of a third switch element T13, and a first electrode of the capacitor Cst.

A first switch element T11 is turned on according to the gate-on voltage VGL of the Nth scan pulse SCAN(N) to connect a gate electrode and a second electrode of a driving element DT. The first switch element T11 includes a gate electrode connected to a second gate line 1035, a first electrode connected to the second node n12, and a second electrode connected to a third node n13. The Nth scan pulse SCAN(N) is supplied to the pixels 101 through the second gate line 1035. The third node n13 is connected to the gate electrode of the driving element DT, the second electrode of the first switch element T11, and a first electrode of a fourth switch element T14.

A second switch element T12 is turned on according to the gate-on voltage VGL of the Nth scan pulse SCAN(N) to apply the data voltage Vdata to a first electrode of the driving element DT. The second switch element T12 includes a gate electrode connected to the second gate line 1035, a first electrode connected to a fifth node n15, and a second electrode connected to a data line 102. The fifth node n15 is connected to the first electrode of the driving element DT, the first electrode of the second switch element T12, and a second electrode of the third switch element T13.

The third switch element T13 supplies the pixel driving voltage ELVDD to the first electrode of the driving element DT in response to the gate-on voltage VEL of the EM pulse EM(N). The third switch element T13 includes a gate electrode connected to a third gate line 1036, the first electrode connected to the first power line 41, and the second electrode connected to the fifth node n15. The EM pulse EM(N) is supplied to the pixels 101 through the third gate line 1036.

The fourth switch element T14 is turned on according to the gate-on voltage VGL of the EM pulse EM(N) to connect the second electrode of the driving element DT to an anode electrode of the light emitting element EL. A gate electrode of the fourth switch element T14 is connected to the third gate line 1036. The first electrode of the fourth switch element T14 is connected to the third node n13, and a second electrode of the fourth switch element T14 is connected to the fourth node n14. The fourth node n14 is connected to the anode electrode of the light emitting element EL, the second electrode of the fourth switch element T14, and a second electrode of a sixth switch element T16.

A fifth switch element T15 is turned on according to the gate-on voltage VGL of the (N−1)th scan pulse SCAN(N−1) and initializes the capacitor Cst and the gate electrode of the driving element DT during the initialization phase Ti by connecting the second node n12 to a third power line 44. The fifth switch element T15 includes a gate electrode connected to a first gate line 1034, a first electrode connected to the second node n12, and a second electrode connected to the third power line 44.

The (N−1)th scan pulse SCAN(N−1) is supplied to the pixels 101 through the first gate line 1034. The initialization voltage Vini is supplied to the pixels 101 through the third power line 44.

The sixth switch element T16 is turned on according to the gate-on voltage VGL of the (N−1)th scan pulse SCAN (N−1) to connect the third power line 44 to the anode electrode of the emitting element EL during the initialization phase Ti. During the initialization phase Ti, an anode voltage of the light emitting element EL is discharged to the initialization voltage Vini through the sixth switch element T16. In this case, the light emitting element EL does not emit light because the voltage between the anode electrode and the cathode electrode is smaller than a threshold voltage of the light emitting element EL. The sixth switch element T16 includes a gate electrode connected to the first gate line 1034, a first electrode connected to the third power line 44, and the second electrode connected to the fourth node n14.

The driving element DT drives the light emitting element EL by controlling the current flowing through the light emitting element EL according to a gate-source voltage Vgs. The driving element DT includes the gate electrode connected to the second node n12, the first electrode connected to the fifth node n15, and the second electrode connected to the third node n13.

An operation of the pixel circuit shown in FIG. 7 may be divided into the initialization phase Ti, the sensing phase Ts, and the light emission phase Tem.

In the initialization phase Ti, the fourth switch element T14 and the fifth switch element T15 are turned on according to the gate-on voltage VGL of the (N−1)th scan pulse SCAN(N−1). At this time, the voltages of the second node n12 and the fourth node n14 are discharged to the initialization voltage Vini. As a result, in the initialization phase Ti, the capacitor Cst, the gate voltage of the driving element DT, and the anode voltage of the light emitting element EL are initialized to the initialization voltage Vini.

In the sensing phase Ts, the first switch element T11 and the second switch element T12 are turned on according to the gate-on voltage VGL of the Nth scan pulse SCAN(N). At this time, the data voltage Vdata is applied to the fifth node n15 and the voltage of the second node n12 is changed to Vdata+Vth. As a result, the threshold voltage Vth of the driving element DT is sensed and charged in the second node n12 in the sensing phase Ts. During the sensing phase Ts, the data voltage Vdata for which the threshold voltage Vth of the driving element DT is compensated is charged in the capacitor Cst.

In the light emission phase Tem, the voltage of the EM pulse EM(N) is inverted to the gate-on voltage VGL. The third switch element T13 and the fourth switch element T14 are turned on in the light emitting phase Tem. During the light emitting phase Tem, a current may flow through the light emitting element EL through the driving element DT so that the light emitting element EL may emit light. The current flowing through the light emitting element EL is adjusted according to the gate-source voltage Vgs of the driving element DT. The gate-source voltage Vgs of the driving element DT is Vgs=Vdata+Vth−ELVDD in the light emission phase Tem.

Referring to FIG. 8, the pixel circuit may include a light emitting element EL, a driving element DT connected to the light emitting element EL, a plurality of switch elements M1 and M2, and a capacitor Cst. The driving element DT and the switch elements M1 and M2 may be implemented as n-channel transistors, but are not limited thereto.

The light emitting element EL emits light with a current generated according to a gate-source voltage Vgs of the driving element DT that varies according to a data voltage Vdata. The light emitting element EL may be implemented as an OLED including an organic compound layer formed between an anode electrode and a cathode electrode.

A first switch element M1 is turned on according to a gate-on voltage of a scan pulse SCAN and connects a data line 102 to a first node n01 to supply the data voltage Vdata to the first node n01. The first switch element M1 includes a gate electrode to which the scan pulse SCAN is applied, a first electrode connected to the data line 102, and a second electrode connected to the first node n01. The first node n01 is connected to a gate electrode of the driving element DT, a first electrode of the capacitor Cst, and the second electrode of the first switch element M1.

A second switch element M2 is turned on according to the gate-on voltage of the scan pulse SCAN or a sensing pulse SENSE to supply a reference voltage Vref to a second node n02. The second switch element M2 includes a gate electrode to which the scan pulse SCAN or the sensing pulse SENSE is applied, a first electrode connected to the second node n02, and a second electrode connected to a sensing line 104 to which the reference voltage Vref is applied. The second node n02 is connected to a second electrode of the driving element DT, a second electrode of the capacitor Cst, and the first electrode of the second switch element M2.

The driving element DT drives the light emitting element EL by supplying a current to the light emitting element EL according to the gate-source voltage Vgs. The driving element DT includes the gate electrode connected to the first node n01, a first electrode to which the pixel driving voltage ELVDD is supplied, and the second electrode connected to the second node n02.

The capacitor Cst is connected between the first node n1 and the second node n2 to maintain the gate-source voltage Vgs of the driving element DT for one frame period.

The external compensation circuit may sense electrical characteristics of the light emitting element EL and the driving element DT by applying the reference voltage Vref to the sensing line 104 to initialize a source voltage of the driving element DT, that is, a voltage of the second node n02, and then sensing the current or voltage of the second node n02. The electrical characteristics of the light emitting element EL and the driving element DT may include a threshold voltage and mobility.

Figure 9:
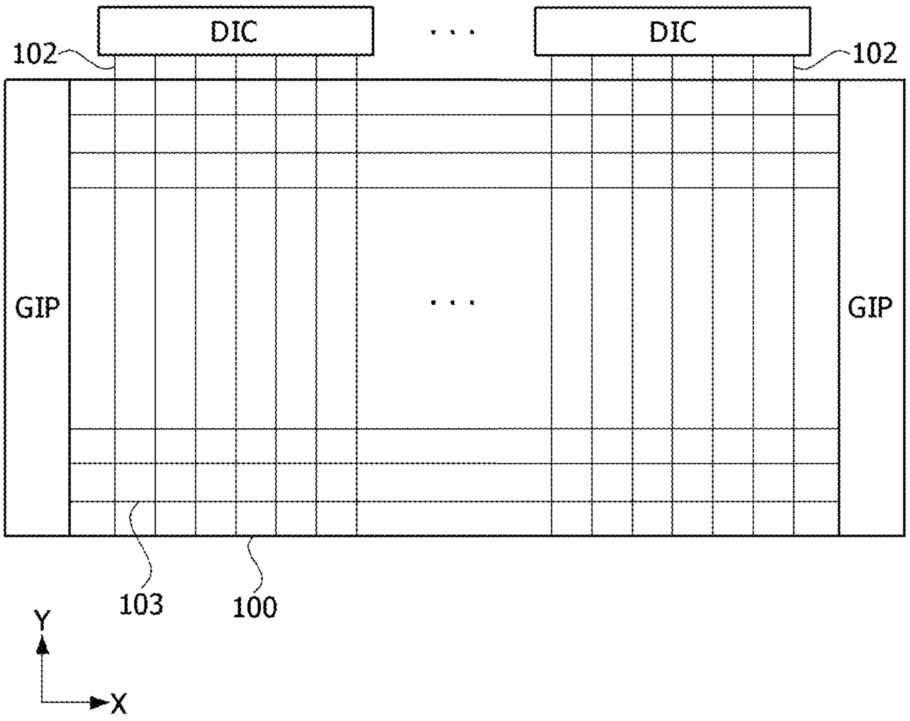
FIG. 9 is a view illustrating a plurality of drive ICs connected to the display panel.

As shown in FIG. 9, the display device may include a plurality of drive ICs DIC. Each of the drive ICs DIC includes a data driver 110. The drive ICs DIC are connected to the display panel 100. The gate drivers GIP may be disposed in both bezel areas of the display panel 100.

Figure 10:
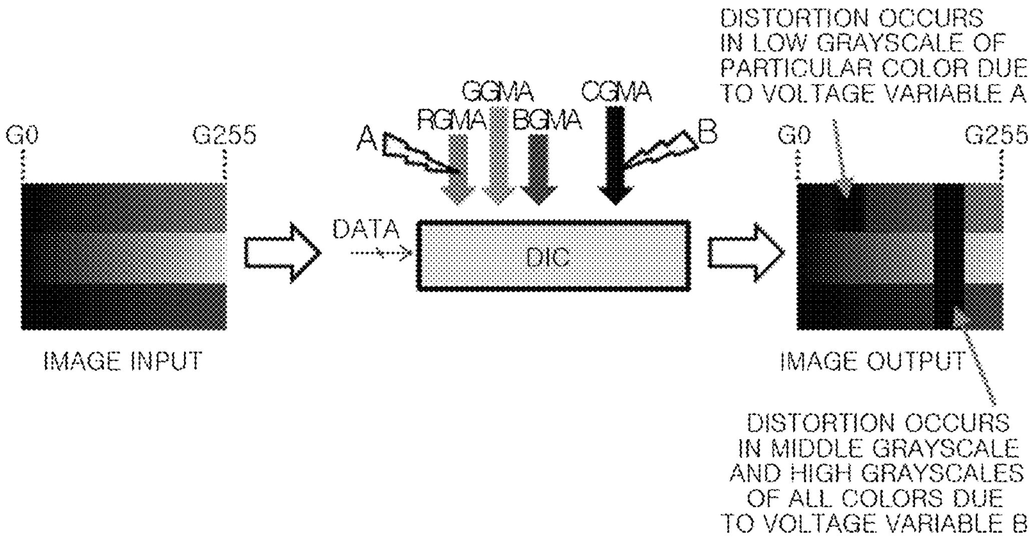
FIG. 10 is a view illustrating a change of an image displayed on the display panel when a gamma tab voltage is changed while image data including a pure color pattern is input to the drive IC according to one exemplary embodiment of the present disclosure.

FIG. 10 is a view illustrating a change in an image displayed on a display panel when a gamma tab voltage is changed while image data including a pure color pattern is input to the drive IC according to one exemplary embodiment of the present disclosure.

Referring to FIG. 10, pixel data DATA of an input image including a first color pattern (red), a second color pattern (green), and a third color pattern (blue) may be input to the drive IC DIC. The pattern of each color in the input image may include all grayscale values from grayscale 0 G0 corresponding to a black grayscale value to grayscale 255 G255 corresponding to a white grayscale value.

The drive IC DIC includes a plurality of data input terminals to which the pixel data DATA of an input image is input, and voltage input terminals to which gamma tab voltages for each color RGMA, GGMA, and BGMA, and common gamma tab voltages CGMA are input. The gamma tab voltages for each color RGMA, GGMA, and BGMA determine a low grayscale voltage less than or equal to the reference grayscale. The common gamma tab voltages CGMA determine a middle grayscale and high grayscale voltage higher than the reference grayscale. The drive IC DIC outputs the data voltage Vdata obtained from the gamma tab voltages for each color RGMA, GGMA, and BGMA when the pixel data DATA is low grayscale data, whereas the drive IC DIC outputs the data voltage Vdata obtained from the common gamma tab voltages CGMA when the pixel data DATA is middle grayscale data or high grayscale data higher than the reference grayscale. As a result, the input image is reproduced on the screen of the display panel 100.

When the input image includes pixel data having different grayscale values for each color, when any one of the gamma tab voltages for each color RGMA, GGMA, and BGMA is changed, the data voltage of a color corresponding to the variable data voltage for each color is changed in the data voltage output from the drive IC DIC. When any one of the common gamma tab voltages CGMA is changed, data voltages of all colors output from the drive IC DIC are changed. In particular, when any one of the gamma tab voltages for each color RGMA, GGMA, and BGMA is changed, the low grayscale data voltage of the corresponding color is changed, and when any one of the common gamma tab voltages CGMA is changed, the data voltages having grayscale values in the middle grayscale and high grayscale areas of all colors are changed.

When any one of the gamma tab voltages for each color RGMA, GGMA, and BGMA is changed, for example, in the image displayed on the display panel 100, distortion occurs in a low grayscale area of a specific color corresponding to the gamma tab voltage of which the voltage is changed. When any one of the common gamma tab voltages CGMA is changed, distortion occurs in the middle grayscale and high grayscale areas of all colors displayed on the display panel 100. A screen distortion generated when the gamma tab voltages RGMA, GGMA, BGMA, and CGMA are changed may be recognized by a viewer.

Figure 11:
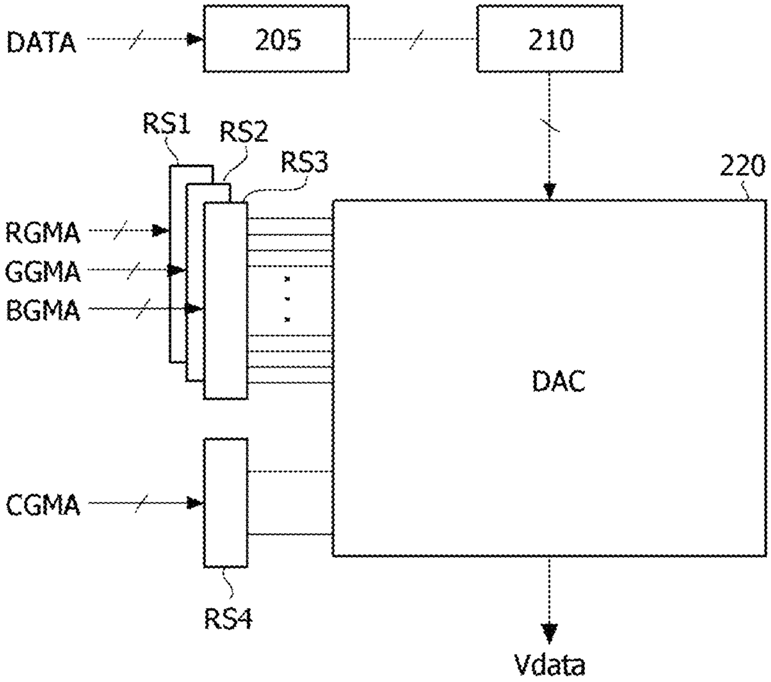
FIG. 11 is a view illustrating a voltage dividing circuit connected to a digital-to-analog converter (DAC) of the drive IC.

FIG. 11 is a view illustrating a voltage dividing circuit connected to a DAC of the drive IC DIC.

Referring to FIG. 11, each of data channels of the drive IC DIC includes a DAC 220.

The gamma tab voltages for each color RGMA, GGMA, and BGMA, and the common gamma tab voltages CGMA are input to the voltage input terminals of the DAC 220. The DAC 220 outputs the data voltage Vdata by converting the pixel data DATA into a gamma compensation voltage for each grayscale obtained from the gamma tab voltages RGMA, GGMA, BGMA, and CGMA.

The drive IC DIC may further include voltage dividing circuits RS1 to RS4 connected between the gamma voltage generating circuit and the voltage input terminals of the DAC 220.

The gamma tab voltages of a first color RGMA include inflection point voltages of a non-linear gamma curve defining the gamma characteristics of the low grayscale area less than or equal to the reference grayscale in the sub-pixels of the first color. The gamma tab voltages of the first color RGMA include three or more gamma tab voltages having different voltage levels in the low grayscale area of the first color. The gamma tab voltages of a second color GGMA include inflection point voltages of a non-linear gamma curve defining the gamma characteristics of the low grayscale area less than or equal to the reference grayscale in the sub-pixels of the second color. The gamma tab voltages of the second color GGMA include three or more gamma tab voltages having different voltage levels in the low grayscale area of the second color. The gamma tab voltages of a third color BGMA include inflection point voltages of a non-linear gamma curve defining the gamma characteristics of the low grayscale area less than or equal to the reference grayscale in the sub-pixels of the third color. The gamma tab voltages of the third color BGMA include three or more gamma tab voltages having different voltage levels in the low grayscale area of the third color.

The common gamma tab voltages CGMA include a minimum voltage and a maximum voltage of a linear gamma curve defining the gamma characteristics of the middle grayscale and high grayscale area higher than the reference grayscale. The common gamma tab voltages CGMA include two gamma tab voltages including a first gamma tab voltage set as a minimum voltage in the middle grayscale and high grayscale area, and a second gamma tab voltage set as the maximum voltage in the middle grayscale and high grayscale area. Accordingly, since the common gamma tab voltages CGMA include only two gamma tab voltages, the number of generated voltages of the common gamma tab voltages CGMA is smaller than that of the gamma tab voltages for each color RGMA, GGMA, and BGMA.

A first voltage dividing circuit RS1 includes series resistors receiving the gamma tab voltages of the first color RGMA and dividing the gamma tab voltage RGMA to generate a low grayscale voltage among the gamma tab voltages RGMA. A second voltage dividing circuit RS2 includes series resistors receiving the gamma tab voltages of the second color GGMA, and dividing the gamma tab voltage GGMA to generate a low grayscale voltage among the gamma tab voltages GGMA. A third voltage dividing circuit RS3 includes series resistors receiving the gamma tab voltages of the third color BGMA and dividing the gamma tab voltage BGMA to generate a low grayscale voltage among the gamma tab voltages BGMA.

A fourth voltage dividing circuit RS4 includes series resistors receiving the common gamma tab voltages CGMA, and dividing the common gamma tab voltage CGMA to generate a grayscale voltage in the middle grayscale and high grayscale linear section among the common gamma tab voltages CGMA. The fourth voltage dividing circuit RS4 divides the common gamma tab voltages CGMA by resistance values of the series resistors to generate the middle grayscale and high grayscale voltages having no color distinction in a linear voltage section among the common gamma tab voltages CGMA, and supplies the generated voltages to the DAC 220.

The display panel driver may further include a bit expansion circuit 205 and a digital gamma compensation circuit 210.

The bit expansion circuit 205 receives pixel data of an input image and expands bits of the data. For example, the bit expansion circuit 205 may convert 8-bit data into data having a number of bits of 10 or more by adding a bit for digital gamma compensation. The bit expansion circuit 205 may be embedded in the drive IC DIC, but is not limited thereto. For example, the bit expansion circuit 205 may be embedded in a digital logic circuit of the timing controller 130.

Figure 13:
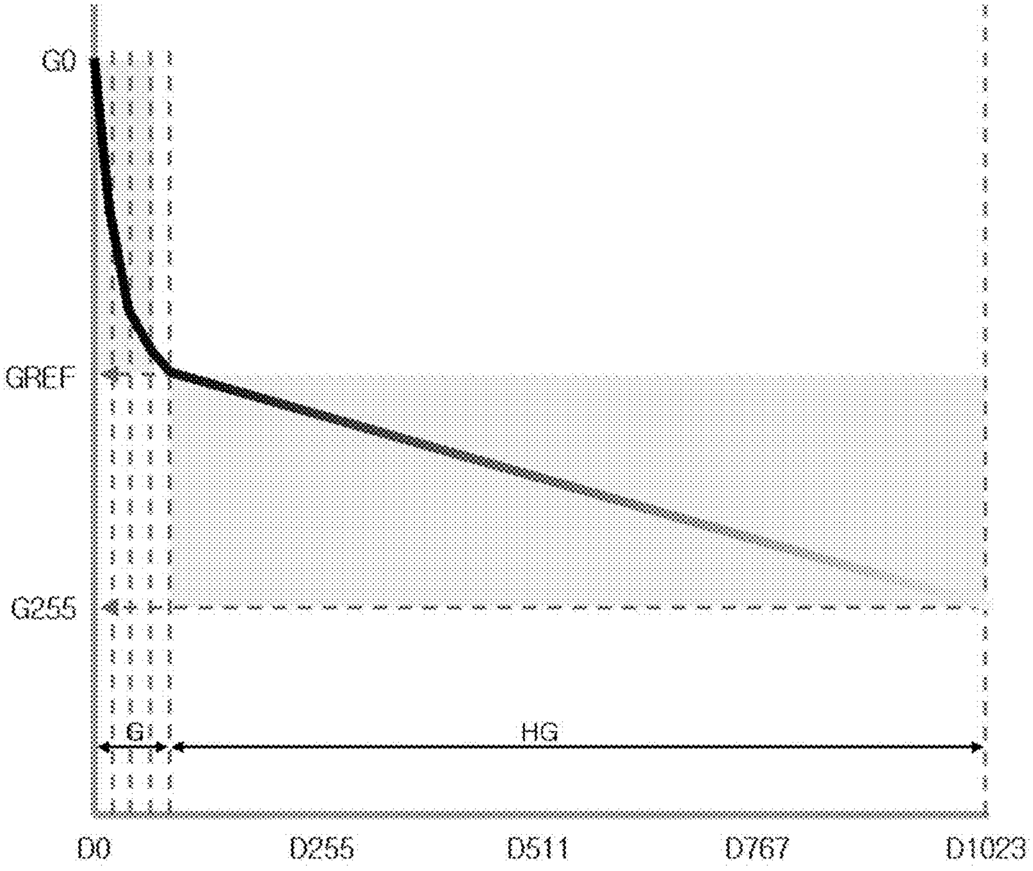
FIG. 13 is a view illustrating an example in which grayscale value of pixel data is modulated.

The digital gamma compensation circuit 210 may modulate a grayscale value of pixel data bit-extended by the bit expansion circuit 205 and provide the modulated grayscale value to the DAC 220. The digital gamma compensation circuit 210 may modulate the grayscale value of the pixel data as shown in FIG. 13 using a look-up table in which the output grayscale value corresponding to the grayscale value of the input data is preset for each color. The digital gamma compensation circuit 210 may be embedded in the drive IC DIC, but is not limited thereto. For example, the digital gamma compensation circuit 210 may be embedded in a digital logic circuit of the timing controller 130.

The gamma tab voltages may be set as an inverse gamma curve or a positive gamma curve according to a pixel circuit structure. For example, when a data voltage is applied to a gate electrode of the driving element implemented as a p-type transistor or a data voltage is applied to a source electrode of the driving element implemented as an n-type transistor, the gamma tab voltages may be set as voltages defined by an inverse gamma curve. The data voltage Vdata of the present disclosure is determined by the gamma tab voltages for each color RGMA, GGMA, and BGMA and the common gamma tab voltages CGMA, and has a different voltage range for each color.

The timing controller 130 may serially transmit the pixel data output from the digital gamma compensation circuit 210 to the data driver 110. The data driver 110 may further include a serial-to-parallel converter. The serial-to-parallel converter may convert the pixel data serially received from the timing controller 130 into parallel data using a shift register and a latch, and supply the converted pixel data to the DAC 220.

Figure 12:
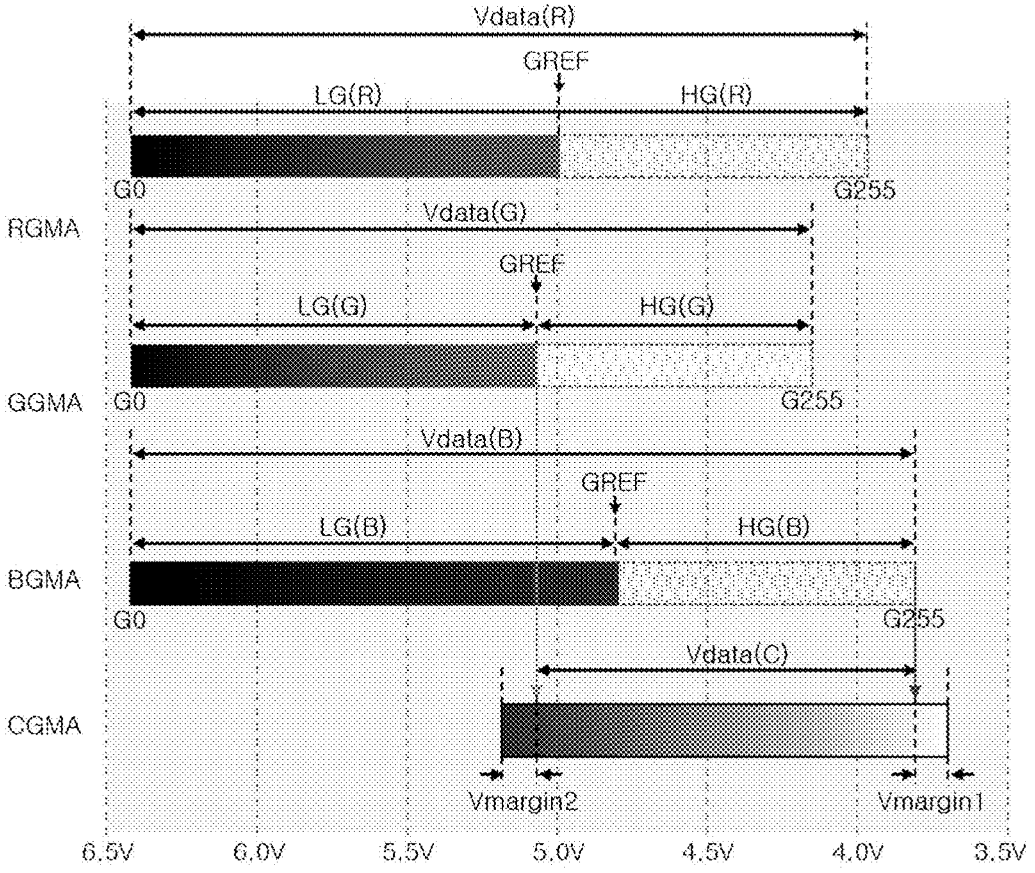
FIG. 12 is a view illustrating a low grayscale voltage range, and a middle grayscale and high grayscale voltage range in a data voltage for each color.

FIG. 12 is a view illustrating an example of data voltages for each color when set as an inverse gamma voltage. In FIG. 12, a horizontal axis is a data voltage [V] determined by the gamma tab voltages RGMA, GGMA, BGMA, and CGMA.

Referring to FIG. 12, a data voltage range of a first color Vdata(R) includes a low grayscale voltage range of the first color LG(R) obtained from the gamma tab voltages of the first color RGMA, and a middle grayscale and high grayscale voltage range of the first color HG(R) obtained from the common gamma tab voltage CGMA. The pixel data of the first color is converted to a voltage within the low grayscale voltage range of the first color LG(R) when it is a low grayscale value less than or equal to the reference grayscale, and converted to a voltage within the middle grayscale and high grayscale voltage range of the first color HG(R) when it is a middle grayscale and high grayscale value greater than the reference grayscale.

A data voltage range of a second color Vdata(G) includes a low grayscale voltage range of the second color LG(G) obtained from the gamma tab voltages of the second color GGMA, and a middle grayscale and high grayscale voltage range of the second color HG(G) obtained from the common gamma tab voltage CGMA. The pixel data of the second color is converted to a voltage within the low grayscale voltage range of the second color LG(G) when it is a low grayscale value less than or equal to the reference grayscale, and converted to a voltage within the middle grayscale and high grayscale voltage range of the second color HG(G) when it is a middle grayscale and high grayscale value greater than the reference grayscale.

A data voltage range of a third color Vdata(B) includes a low grayscale voltage range of the third color LG(B) obtained from the gamma tab voltages of the third color BGMA, and a middle grayscale and high grayscale voltage range of the third color HG(B) obtained from the common gamma tab voltage CGMA. The pixel data of the third color is converted to a voltage within the low grayscale voltage range of the third color LG(B) when it is a low grayscale value less than or equal to the reference grayscale, and converted to a voltage within the middle grayscale and high grayscale voltage range of the third color HG(B) when it is a middle grayscale and high grayscale value greater than the reference grayscale.

The low grayscale voltage ranges for each color LG(R), LG(G), and LG(B) are data voltage ranges from the black grayscale G0 to the reference grayscale. The low grayscale data voltage range of the first color Vdata(R), the low grayscale data voltage range of the second color Vdata(G), and the low grayscale data voltage range of the third color Vdata(B) are different from each other. The middle grayscale and high grayscale voltage ranges for each color HG(R), HG(G), and HG(B) are voltage ranges from the reference grayscale+1 to the white grayscale G255, and fall within a common middle grayscale and high grayscale voltage range Vdata(C).

The data voltage of the pixel data is selected from one of the gamma tab voltages for each color RGMA, GGMA, and BGMA and the common gamma tab voltages CGMA according to the grayscale value. Accordingly, the common gamma tab voltages CGMA should be appropriately set so that a difference in a voltage level is not large when the data voltage Vdata is switched among the gamma tab voltages for each color RGMA, GGMA, and BGMA and the common gamma tab voltages CGMA.

For example, a minimum voltage of the common middle grayscale and high grayscale voltage range Vdata(C) obtained from the common gamma tab voltages CGMA may be set to the smallest minimum voltage among the minimum voltages of the data voltage ranges for each color Vdata(R), Vdata(G), and Vdata(B), that is, the white grayscale voltage. In an example of FIG. 12, a minimum voltage of the common middle grayscale and high grayscale voltage range Vdata(C) may be set to the minimum voltage of the third color B which is the smallest minimum voltage among the data voltage ranges for each color Vdata(R), Vdata(G), and Vdata(B). The output voltage of the gamma voltage generating circuit may vary due to temperature characteristics or other causes. In consideration of this, the minimum voltage of the common middle grayscale and high grayscale voltage range Vdata(C) may be set to a margin voltage Vmargin1 less than the smallest minimum voltage among the minimum voltages of the data voltage ranges for each color Vdata(R), Vdata(G), and Vdata(B).

A maximum voltage of the common middle grayscale and high grayscale voltage range Vdata(C) may be set to the maximum voltage among the reference grayscale voltages GREF of the gamma tab voltage ranges for each color Vdata(R), Vdata(G), and Vdata(B). In an example of FIG. 12, the maximum voltage of the common middle grayscale and high grayscale voltage range Vdata(C) may be set to the reference grayscale voltage of the second color G which is the largest among the reference grayscale voltages GREF among the first, second, and third colors. The output voltage of the gamma voltage generating circuit may vary due to the temperature characteristics or other causes. In consideration of this, the maximum voltage of the common middle grayscale and high grayscale voltage range Vdata(C) may overlap the low grayscale voltage range LG(R), LG(G), and LG(B) of the data voltage ranges for each color Vdata(R), Vdata(G), and Vdata(B). For example, the maximum voltage of the common middle grayscale and high grayscale voltage range Vdata(C) may be set to a margin voltage Vmargin2 higher than the reference grayscale voltage of the second color G.

FIG. 13 is a view illustrating an example in which the grayscale value of the pixel data is modulated. In FIG. 13, a horizontal axis represents grayscale values D0 to D1023 of the pixel data input to a digital compensation circuit 210, and a vertical axis represents grayscale values G0~G255 of the pixel data output from the digital compensation circuit 210 and provided to the DAC 220. In FIG. 13, 'LG' is a non-linear gamma curve section of a low grayscale area, and 'HG' is a linear gamma curve section of a middle grayscale and high grayscale area.

When the grayscale value of the pixel data is a low grayscale less than or equal to the reference grayscale GREF, the data voltage Vdata of the pixel data is converted to a data voltage obtained from the gamma tab voltage ranges for each color Vdata(R), Vdata(G), and Vdata(B) set to a voltage of a non-linear gamma curve of a corresponding color. When the grayscale value of the pixel data is a grayscale value higher than the reference grayscale GREF, the data voltage Vdata of the pixel data is converted to a data voltage obtained from the common middle grayscale and high grayscale voltage range Vdata(C) set to a voltage of a linear gamma curve of a corresponding color.

The display device of the present disclosure can implement a high bit resolution because the data voltage is a non-linear curve in the low grayscale area less than or equal to the reference grayscale GREF and a voltage difference among grayscales in the pixel data is large. Furthermore, the display device of the present disclosure can improve grayscale expression by securing a bit resolution of 10 bits or more because the grayscale voltage of the pixel data implements a linear gamma curve in the middle grayscale and high grayscale area higher than the reference grayscale GREF.

The present disclosure generates a low grayscale data voltage implementing a non-linear gamma curve of a low grayscale area from gamma tab voltages for each color, and generates a data voltage of a middle grayscale and high grayscale area implementing a linear gamma curve of the middle grayscale and high grayscale area from common gamma tab voltages.

A display device of the present disclosure can implement a high bit resolution because a data voltage is a non-linear curve in a low grayscale area less than or equal to a reference grayscale GREF, and a voltage difference between grayscales in pixel data is large. Furthermore, the display device of the present disclosure can improve grayscale expression by securing a bit resolution of 10 bits or more because a grayscale voltage of the pixel data implements a linear gamma curve in a middle grayscale and high grayscale area higher than the reference grayscale GREF.

It will be apparent to those skilled in the art that various modifications and variations can be made in the data driving circuit and the display device including the same of the present disclosure without departing from the technical idea or scope of the disclosure. Thus, it is intended that the present disclosure cover the modifications and variations of this disclosure provided they come within the scope of the appended claims and their equivalents.

What is claimed is:

1. A data driving circuit, comprising:

a plurality of data input terminals to which pixel data of an input image is input;

a plurality of voltage input terminals to which gamma tab voltages for each color having different voltage levels, and common gamma tab voltages having different voltage levels are each input; and a plurality of output terminals to which a data voltage of a first color, a data voltage of a second color, and a data voltage of a third color are output, wherein:

a data voltage range of the first color includes a low grayscale voltage range of the first color obtained from the gamma tab voltages of the first color, and a middle grayscale and high grayscale voltage range of the first color obtained from the common gamma tab voltages, a data voltage range of the second color includes a low grayscale voltage range of the second color obtained from the gamma tab voltages of the second color, and a middle grayscale and high grayscale voltage range of the second color obtained from the common gamma tab voltages, a data voltage range of the third color includes a low grayscale voltage range of the third color obtained from the gamma tab voltages of the third color, and a middle grayscale and high grayscale voltage range of the third color obtained from the common gamma tab voltages, a minimum voltage of a common middle grayscale and high grayscale voltage range obtained from the common gamma tab voltages is configured to be set to a smallest minimum voltage among minimum voltages of data voltage ranges of the first color, the second color, and the third color, and a maximum voltage of the common middle grayscale and high grayscale voltage range is configured to be set to a maximum voltage among reference grayscale voltages of the data voltage ranges of the first color, the second color, and the third color.

2. The data driving circuit of claim 1, wherein a low grayscale data voltage of the corresponding color is changed when any one of the gamma tab voltages for each color is changed, and data voltages having grayscale values in middle grayscale and high grayscale areas of all the colors are changed when any one of the common gamma tab voltages is changed.

3. The data driving circuit of claim 2, wherein the gamma tab voltages for each color include low grayscale voltages, and the common gamma tab voltages include middle grayscale and high grayscale voltages.

4. The data driving circuit of claim 2, wherein the gamma tab voltages for each color include non-linear voltages in a low grayscale area, and the common gamma tab voltages include linear voltages of the middle grayscale and high grayscale areas.

5. The data driving circuit of claim 4, wherein the gamma tab voltages for each color include:

gamma tab voltages of a first color including inflection point voltages in a non-linear gamma curve of the first color;

gamma tab voltages of a second color including inflection point voltages in a non-linear gamma curve of the second color; and gamma tab voltages of a third color including inflection point voltages in a non-linear gamma curve of the third color.

6. The data driving circuit of claim 1, wherein a low grayscale voltage range of the first color, a low grayscale voltage range of the second color, and a low grayscale voltage range of the third color are different from each other.

7. The data driving circuit of claim 6, wherein the common gamma tab voltages include a minimum voltage higher than a reference grayscale and a maximum voltage corresponding to a white grayscale value.

8. The data driving circuit of claim 1, wherein a maximum voltage of the common middle grayscale and high grayscale voltage range obtained from the common gamma tab voltages overlaps the low grayscale voltage range of each of the data voltage ranges of the first color, the second color, and the third color.

9. The data driving circuit of claim 1, further comprising:

a plurality of output terminals to which a data voltage of a first color, a data voltage of a second color, and a data voltage of a third color are output;

a first voltage dividing circuit configured to output low grayscale voltages of the first color by dividing gamma tab voltages of the first color;

a second voltage dividing circuit configured to output low grayscale voltages of the second color by dividing gamma tab voltages of the second color;

a third voltage dividing circuit configured to output low grayscale voltages of the third color by dividing gamma tab voltages of the third color;

a fourth voltage dividing circuit configured to be separated from the first voltage dividing circuit, the second voltage dividing circuit, and the third voltage dividing circuit to output middle grayscale and high grayscale voltages having no color distinction by dividing the common gamma tab voltages; and a digital-to-analog converter configured to output the data voltage of the first color, the data voltage of the second color, and the data voltage of the third color the data voltage by converting the pixel data of the input image into voltages input through the first to fourth voltage dividing circuits.

10. A data driving circuit, comprising:

a plurality of data input terminals to which pixel data of an input image is input;

a plurality of voltage input terminals to which gamma tab voltages for each color having different voltage levels, and common gamma tab voltages having different voltage levels are each input; and a plurality of output terminals to which a data voltage of a first color, a data voltage of a second color, and a data voltage of a third color are output, wherein:

a data voltage range of the first color includes a low grayscale voltage range of the first color obtained from the gamma tab voltages of the first color, and a middle grayscale and high grayscale voltage range of the first color obtained from the common gamma tab voltages, a data voltage range of the second color includes a low grayscale voltage range of the second color obtained from the gamma tab voltages of the second color, and a middle grayscale and high grayscale voltage range of the second color obtained from the common gamma tab voltages, a data voltage range of the third color includes a low grayscale voltage range of the third color obtained from the gamma tab voltages of the third color, and a middle grayscale and high grayscale voltage range of the third color obtained from the common gamma tab voltages, a minimum voltage of a common middle grayscale and high grayscale voltage range obtained from the common gamma tab voltages is configured to be set to a first margin voltage less than a smallest minimum voltage among minimum voltages of data voltage ranges of the first color, the second color, and the third color, and a maximum voltage of the common middle grayscale and high grayscale voltage range is configured to be set to a second margin voltage greater than a maximum voltage among reference grayscale voltages of the data voltage ranges of the first color, the second color, and the third color.

11. A display device, comprising:

a display panel connected to a plurality of data lines and a plurality of gate lines, and in which an input image is displayed; and a drive IC configured to convert pixel data of the input image into a data voltage and supply the data voltage to the data lines, wherein the drive IC comprises:

a plurality of data input terminals to which the pixel data of the input image is input;

a plurality of voltage input terminals to which gamma tab voltages for each color having different voltage levels, and common gamma tab voltages having different voltage levels are each input; and a plurality of output terminals to which a data voltage of a first color, a data voltage of a second color, and a data voltage of a third color are output, and wherein:

a data voltage range of the first color includes a low grayscale voltage range of the first color obtained from gamma tab voltages of the first color, and a middle grayscale and high grayscale voltage range of the first color obtained from the common gamma tab voltages, a data voltage range of the second color includes a low grayscale voltage range of the second color obtained from gamma tab voltages of the second color, and a middle grayscale and high grayscale voltage range of the second color obtained from the common gamma tab voltages, a data voltage range of the third color includes a low grayscale voltage range of the third color obtained from gamma tab voltages of the third color, and a middle grayscale and high grayscale voltage range of the third color obtained from the common gamma tab voltages, a minimum voltage of a common middle grayscale and high grayscale voltage range obtained from the common gamma tab voltages is configured to be set to either a smallest minimum voltage among minimum voltages of data voltage ranges of the first color, the second color, and the third color, or a first margin voltage less than the smallest minimum voltage, and a maximum voltage of the common middle grayscale and high grayscale voltage range is configured to be set to either a maximum voltage among reference grayscale voltages of the data voltage ranges of the first color, the second color, and the third color, or a second margin voltage greater than the maximum voltage.

12. The display device of claim 11, wherein the low grayscale voltage range of the first color, the low grayscale voltage range of the second color, and the low grayscale voltage range of the third color are different from each other, and the common gamma tab voltages include a minimum voltage higher than a reference grayscale and a maximum voltage corresponding to a white grayscale value.

13. The display device of claim 11, wherein a maximum voltage of the common middle grayscale and high grayscale voltage range obtained from the common gamma tab voltages overlaps the low grayscale voltage range of the data voltage ranges of the first color, the second color, and the third color.

14. The display device of claim 11, wherein when any one of the gamma tab voltages for each color is changed, distortion occurs in an image displayed on the display panel in a low grayscale area less than or equal to a predetermined reference grayscale, and when any one of the common gamma tab voltages is changed, distortion occurs in all colors of an image displayed on the display panel in a middle grayscale and high grayscale area higher than the reference grayscale.

15. The display device of claim 11, wherein the drive IC further comprises:

a plurality of output terminals to which a data voltage of a first color, a data voltage of a second color, and a data voltage of a third color are output;

a first voltage dividing circuit configured to output low grayscale voltages of the first color by dividing gamma tab voltages of the first color;

a second voltage dividing circuit configured to output low grayscale voltages of the second color by dividing gamma tab voltages of the second color;

a third voltage dividing circuit configured to output low grayscale voltages of the third color by dividing gamma tab voltages of the third color;

a fourth voltage dividing circuit configured to be separated from the first voltage dividing circuit, the second voltage dividing circuit, and the third voltage dividing circuit to output middle grayscale and high grayscale voltages having no color distinction by dividing the common gamma tab voltages; and a digital-to-analog converter configured to output the data voltage of the first color, the data voltage of the second color, and the data voltage of the third color the data voltage by converting the pixel data of the input image into voltages input through the first to fourth voltage dividing circuits.

* * * * *